United States Patent
Miyano

(10) Patent No.: US 10,287,445 B2
(45) Date of Patent: May 14, 2019

(54) INKJET INK AND IMAGE FORMING METHOD

(71) Applicant: Konica Minolta, Inc., Tokyo (JP)

(72) Inventor: Masashi Miyano, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/712,677

(22) Filed: Sep. 22, 2017

(65) Prior Publication Data

US 2018/0105708 A1   Apr. 19, 2018

(30) Foreign Application Priority Data

Oct. 17, 2016 (JP) .................................. 2016-203691

(51) Int. Cl.
| | |
|---|---|
| C09D 11/38 | (2014.01) |
| C09D 11/101 | (2014.01) |
| C09D 11/322 | (2014.01) |
| C08K 9/02 | (2006.01) |
| C09D 11/34 | (2014.01) |
| C09D 179/02 | (2006.01) |

(52) U.S. Cl.
CPC .......... *C09D 11/101* (2013.01); *C09D 11/322* (2013.01); *C09D 11/38* (2013.01); *C08K 9/02* (2013.01); *C09D 11/34* (2013.01); *C09D 179/02* (2013.01)

(58) Field of Classification Search
CPC .............................. C09D 11/38; C09D 11/101
See application file for complete search history.

(56) References Cited

U.S. PATENT DOCUMENTS

| | | | | |
|---|---|---|---|---|
| 6,692,800 B1* | 2/2004 | Jacobs | .................... | D21H 27/10 427/372.2 |
| 2015/0138289 A1* | 5/2015 | Iijima | .................... | B41J 11/002 347/102 |
| 2015/0191627 A1* | 7/2015 | Illsley | .................. | C09D 177/00 428/203 |

FOREIGN PATENT DOCUMENTS

| | | |
|---|---|---|
| EP | 3235885 A1 | 10/2017 |
| JP | 2006124636 A | 5/2006 |
| JP | 2006316115 A | 11/2006 |
| JP | 2009203408 A | 9/2009 |
| JP | 2015533876 A | 11/2015 |
| WO | 2016/007593 A1 | 1/2016 |
| WO | 2016/098678 A1 | 6/2016 |

OTHER PUBLICATIONS

Extended Search Report dated Jan. 19, 2018 from the corresponding European Application No. 17196661.7.

* cited by examiner

*Primary Examiner* — Karuna P Reddy
(74) *Attorney, Agent, or Firm* — Lucas & Mercanti, LLP

(57) ABSTRACT

An active ray curable inkjet ink includes: a radical polymerizable compound; a radical polymerization initiator; a color material; and an odor material scavenger, wherein the radical polymerization initiator is a compound producing aldehyde, the radical polymerizable compound contains a monofunctional radical polymerizable compound in an amount of 0 mass % to 10 mass % with respect to the total mass of the ink, the odor material scavenger is a compound having a primary amine group or secondary amine group and having a molecular weight of 1000 or less, or is a compound having a hydroxyl group or a compound having an aromatic ring-substituted hydroxyl group and having a molecular weight of 1000 or less, the content of the odor material scavenger is lower than that of the radical polymerization initiator, and the absorbance of the inkjet ink to light having a wavelength of 365 nm to 395 nm is 400 to 1000.

7 Claims, No Drawings

INKJET INK AND IMAGE FORMING METHOD

Japanese Patent Application No. 2016-203691 filed on Oct. 17, 2016, including description, claims, drawings, and abstract the entire disclosure is incorporated herein by reference in its entirety.

BACKGROUND

Technological Field

The present invention relates to an inkjet ink and an image forming method.

Description of the Related Art

An inkjet image forming method is a method of forming an image, in which ink droplets are ejected from nozzles of an ejection head mounted on an image forming apparatus for inkjet to land the ink droplets on a recording medium to form dots constituting an image, thereby forming an image. In the inkjet image forming method, an ink is landed only on a portion of a recording medium, a color being applied to the portion, so that a high-definition image can be formed simply and inexpensively.

An inkjet recording method is used in various printing fields because it can easily and inexpensively form an image. As one of inkjet inks, an ink containing a radical polymerizable compound which is polymerized by being irradiated with active rays to cure the ink (hereinafter, simply referred to as "active ray curable ink") is known. The active ray curable ink has attracted a considerable attention in recent years because it can form an image having high adhesiveness even in recording media having low water absorbability.

The active ray curable ink contains a radical polymerization initiator initiating the polymerization of a radical polymerizable compound. When the radical polymerization initiator is irradiated with active rays, the radical polymerization initiator disintegrates to generate radicals or acids to initiate polymerization of the radical polymerizable compound. At this time, the radical polymerization initiator may disintegrate to produce aldehyde. This aldehyde precipitates from a cured film formed by curing the active ray curable ink irradiated with active rays (hereinafter, the precipitation of an ink-derived compound from the cured film is also simply referred to as "migration"), thereby causing unpleasant odor.

Therefore, various methods for reducing the odor from the cured film have been studied. For example, JP 2006-124636 A discloses that it is possible to reduce the odor derived from a compound having sulfur, generated by decomposing a photoacid generator, which is a radical polymerization initiator, when irradiated with light, by including a mixture of malic acid and glyoxal or a naturally derived extract component such as catechin in the ink. JP 2006-316115 A discloses that the odor from the cured film can be reduced by including various fragrances in the ink.

Further, JP 2009-203408 A discloses that a polymerization inhibitor, an antioxidant, a radical scavenger or the like is contained in a colorless coating composition applied by a roll coater or the like, thereby deodorizing a cured film formed from this composition. JP 2015-533876 A discloses that a compound having a primary or secondary amine group is contained in a colorless coating composition used as varnish, thereby deodorizing a cured film formed from this composition.

As described above, JP 2006-124636 A, JP 2006-316115 A, JP 2009-203408 A, and JP 2015-533876 A it is highly required to reduce an odor, particularly, an irritating odor derived from aldehyde, from a cured film. Further, when forming an image for food packaging, a compound precipitated from the cured film may sometimes lose the favor of food. Therefore, it is also required to reduce the migration amount of the compound from the cured film.

However, JP 2006-124636 A intends to reduce an odor derived from a compound having sulfur, and does not intend to reduce an odor derived from aldehyde or the migration amount of aldehyde. Further, JP 2006-316115 A intends to impart a new flavor to the cured film by fragrance, and does not intend to reduce the migration amount of aldehyde or the like.

Further, the methods described in JP 2009-203408 A and JP 2015-533876 A intend to reduce an odor from a colorless coating composition. According to the study of the present inventors, even if the same compound was added to the active ray curable ink containing a pigment, a desired deodorizing effect could not be obtained, and the migration amount was difficult to suppress.

SUMMARY

The present invention has been made in view of the above circumstances, and an object of the present invention is to provide an inkjet ink which can reduce an aldehyde-derived odor of a cured film formed by irradiating an active ray curable ink containing a pigment with active rays and can suppress the migration amount from the cured film, and an image forming method using such an inkjet ink.

To achieve the abovementioned object, according to an aspect of the present invention, an active ray curable inkjet ink reflecting one aspect of the present invention comprises: a radical polymerizable compound; a radical polymerization initiator; a color material; and an odor material scavenger, wherein the radical polymerization initiator is a compound producing aldehyde by irradiation with active rays, the radical polymerizable compound contains a monofunctional radical polymerizable compound in an amount of 0 mass % to 10 mass % with respect to the total mass of the ink, the odor material scavenger is a compound having a primary amine group or secondary amine group in a molecule and having a molecular weight of 1000 or less, or is a compound having a hydroxyl group where α-position carbon is primary carbon or a compound having an aromatic ring-substituted hydroxyl group and having a molecular weight of 1000 or less, the content of the odor material scavenger is lower than the content of the radical polymerization initiator, and the absorbance of the inkjet ink to light having a wavelength of 365 nm to 395 nm is 400 to 1000.

DETAILED DESCRIPTION OF EMBODIMENTS

Hereinafter, one or more embodiments of the present invention will be described. However, the scope of the invention is not limited to the disclosed embodiments.

As a result of earnest study on the above-mentioned problems, the present inventors found that according to an active ray curable ink containing a larger amount of a polyfunctional radical polymerizable compound and containing a specific odor material scavenger, an aldehyde-derived odor from a cured film formed by irradiating with active rays, and the migration amount from the cured film can also be suppressed. Based on this finding, the present invention has been completed.

An inkjet ink according to an embodiment of the present invention (hereinafter, simply referred to as "inkjet ink") is an active ray curable ink including a radical polymerizable compound, a radical polymerization initiator, a color material, and an odor material scavenger. The radical polymerization initiator includes a compound producing aldehyde by irradiation with active rays (hereinafter, simply referred to as "an aldehyde producing initiator"). The content of a monofunctional radical polymerizable compound contained in the radical polymerizable compound is 10 mass % or less with respect to the total mass of the ink. The odor material scavenger is a compound having a primary amine group or secondary amine group in a molecule and having a molecular weight of 1000 or less (hereinafter, simply referred to as "an amine-based scavenger), or is a compound having a hydroxyl group where α-position carbon is primary carbon or a compound having an aromatic ring-substituted hydroxyl group and having a molecular weight of 1000 or less (hereinafter, simply referred to as "an OH-based scavenger"). The content of the odor material scavenger contained in the inkjet ink is lower than the content of the radical polymerization initiator. The absorbance of the inkjet ink to light having a wavelength of 365 nm to 395 nm is 400 to 1000.

The aldehyde produced from an aldehyde producing initiator when the active ray curable ink is irradiated with active rays reacts with an amine-based scavenger to produce hemiaminal represented by Formula (1), or reacts with an OH-based scavenger to produce hemiacetal represented by Formula (2).

[Chemical Formula 1]

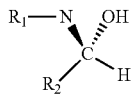

Formula (1)

In Formula (1), $R_1$ is a residue derived from an amine-based scavenger, and $R_2$ is a residue derived from aldehyde produced by the decomposition of an aldehyde producing initiator.

[Chemical Formula 2]

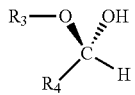

Formula (2)

In Formula (2), $R_3$ is a residue derived from an OH-based scavenger, and $R_4$ is a residue derived from aldehyde produced by the decomposition of an aldehyde producing initiator.

It is considered that the dehydration reaction from hemiaminal to aminal and the dehydration reaction from hemiacetal to acetal are unlikely to occur in the active ray curable inkjet ink. Even if these reactions occur, there is no influence on odor and thus it does not become a problem.

Here, in the inkjet ink, the content of a monofunctional radical polymerizable compound is 10 mass % or less with respect to the total mass of the ink, so that a sufficiently dense reticular hydrocarbon chain is formed by the polyfunctional radical polymerizable compound which is present in a large amount in the inkjet ink. Therefore, it is considered that the above-mentioned hemiaminal and hemiacetal having a relatively large molecular weight and having a bent structure in a molecule do not easily precipitate outside the cured film without passing through the gaps between the reticular hydrocarbon chains.

Hemiaminal and hemiacetal are unstable materials, and are easily decomposed into aldehyde and amine or aldehyde and alcohol in the air when they precipitate outside the cured film. Therefore, from the viewpoint of reducing an odor from the cured film, it is considered that it is not enough to convert aldehyde into hemiaminal or hemiacetal and it is also necessary to suppress the precipitation of hemiaminal and hemiacetal by the above-mentioned reticular hydrocarbon chain.

When the active ray curable ink contains a color material, active rays are absorbed by the color material, so that a part of the radical polymerization initiator, not reached by active rays, may remain without being decomposed. Therefore, when the content of the odor material scavenger in the inkjet ink is adjusted to be equal to or higher than the content of the aldehyde producing initiator, a part of the odor material scavenger may remain without reacting with the produced aldehyde. Therefore, when the remaining unreacted odor material scavenger precipitates from the cured film, the migration amount from the cured film may be rather increased.

In contrast, when the absorbance of the inkjet ink to light having a wavelength of at least part of 365 nm to 395 nm is within 400 to 1000 and the content of the odor material scavenger is lower than the content of the aldehyde producing initiator, the amount of the odor material scavenger remaining without reacting with aldehyde is reduced, and thus it is possible to reduce the odor derived from the remaining odor material scavenger.

When the absorbance is less than 400, the amount of aldehyde produced from the aldehyde producing initiator becomes excessive, and the odor derived from aldehyde which cannot be captured by the odor material scavenger becomes high. When the absorbance is more than 1000, the amount of the aldehyde producing initiator remaining without being decomposed increases, and the amount of the odor material scavenger remaining without reacting with aldehyde also increases, so that the migration amount of these materials increases.

In particular, the degree of decomposition of the aldehyde producing initiator is adjusted by setting the absorbance to 400 to 1000, the produced aldehyde sufficiently reacts with the odor material scavenger by allowing the content of the odor material scavenger to be lower than the content of the aldehyde producing initiator, the aldehyde producing initiator, the produced aldehyde, and the odor material scavenger sufficiently react, and thus these components hardly remain unreacted.

Hereinafter, the inkjet ink and an image forming method using this inkjet ink will be described in more detail.

1. Inkjet Ink

The inkjet ink is an active ray curable ink including a radical polymerizable compound, a radical polymerization initiator, a color material, and an odor material scavenger and cured by irradiation with active rays. The radical polymerization initiator includes a compound (aldehyde producing initiator) producing aldehyde by irradiation with active rays. The content of a polyfunctional radical polymerizable compound contained in the radical polymerizable compound is 90 mass % or more with respect to the total mass of the ink. The odor material scavenger is a compound having a primary amine group or secondary amine group in a molecule and having a molecular weight of 1000 or less (amine-based scavenger), or is a compound having a hydroxyl group where α-position carbon is primary carbon or a compound having an aromatic ring-substituted hydroxyl group and having a molecular weight of 1000 or less (OH-based scavenger). The inkjet ink may further include a color material or a gelling agent.

1-1. Radical Polymerizable Compound

The radical polymerizable compound may be a compound having a function of curing the ink by causing a polymerization or crosslinking reaction by irradiation with active rays to be polymerized or crosslinked. The radical polymerizable compound may be a monomer, a polymerizable oligomer, a prepolymer, or a mixture thereof. Only one kind of the radical polymerizable compound may be contained in the inkjet ink or two or more kinds thereof may be contained in the inkjet ink.

The content of the radical polymerizable compound can be, for example, 1 mass % to 97 mass % with respect to the total mass of the inkjet ink.

The radical polymerizable compound may include a polyfunctional radical polymerizable compound, and may also include a monofunctional radical polymerizable compound. However, the content of the monofunctional radical polymerizable compound is 0 mass % to 10 mass % with respect to the total mass of the inkjet ink. When the content of the monofunctional radical polymerizable compound is 10 mass % or less with respect to the total mass of the inkjet ink, the gaps derived from the monofunctional radical polymerizable compound, generated in the reticular hydrocarbon chain generated by polymerization and crosslinking of the radical polymerizable compound are reduced, and thus it is possible to reduce the amount of hemiaminal or hemiacetal precipitated from the cured film through the gaps. Further, when the content of the monofunctional radical polymerizable compound is 10 mass % or less with respect to the total mass of the inkjet ink, similarly, the unreacted radical polymerizable compound, unreacted radical polymerization initiator, unreacted odor material scavenger, aldehyde not reacted with the odor material scavenger, and decomposition products of the radical polymerization initiator other than aldehyde become difficult to pass through the gaps and precipitate from the cured film, so that the migration amount from the cured film can be further reduced.

From the above viewpoint, the content of the monofunctional radical polymerizable compound is preferably 0 mass % to 5 mass %, and more preferably 0 mass % to 3 mass % with respect to the total mass of the inkjet ink. Preferably, the inkjet ink does not substantially contain a monofunctional radical polymerizable compound. In the present invention, the fact that the inkjet ink does not substantially contain any material means that the content of the material is 1 mass % or less with respect to the total mass of the inkjet ink or is a negligible amount.

The radical polymerizable compound is preferably an unsaturated carboxylic acid ester compound, and more preferably (meth)acrylate. In the present invention, the "(meth) acrylate" means acrylate or methacrylate, the "(meth)acryloyl group" means an acryloyl group or a methacryloyl group, and the "(meth)acryl" means acryl or methacryl.

Examples of polyfunctional (meth)acrylate include difunctional acrylates, such as triethylene glycol di(meth) acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, PO adduct di(meth)acrylate of bisphenol A, hydroxypivalic acid neopentyl glycol di(meth)acrylate, polytetramethylene glycol di(meth)acrylate, polyethylene glycol diacrylate, tripropylene glycol diacrylate, and tricyclodecanedimethanol diacrylate; and tri- or more functional acrylates, such as trimethylolpropane tri(meth)acrylate, pentaerythritol tri (meth)acrylate, pentaerythritol tetra(meth)acrylate, dipentaerythritol hexa(meth)acrylate, ditrimethylolpropane tetra (meth)acrylate, glycerin propoxy tri(meth)acrylate, and pentaerythritol ethoxy tetra(meth)acrylate.

Examples of monofunctional (meth)acrylate include isoamyl (meth)acrylate, stearyl (meth)acrylate, lauryl (meth) acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth) acrylate, 2-hydroxy-3-phenoxypropyl (meth)acrylate, 2-(meth)acryloyloxyethyl succinic acid, 2-(meth)acryloyloxyethyl phthalic acid, 2-(meth)acryloyloxyethyl-2-hydroxyethyl-phthalic acid, and t-butylcyclohexyl (meth)acrylate.

The (meth)acrylate may be a modified product. Examples of the (meth)acrylate, which is a modified product, include ethylene oxide-modified (meth)acrylates such as triethylene glycol diacrylate, polyethylene glycol diacrylate, ethylene oxide-modified trimethylolpropane tri(meth)acrylate, and ethylene oxide-modified pentaerythritol tetraacrylate; propylene oxide-modified (meth)acrylates such as tripropylene ethylene glycol diacrylate, polypropylene glycol diacrylate, propylene oxide-modified trimethylolpropane tri(meth)acrylate, and propylene oxide-modified pentaerythritol tetraacrylate; caprolactone-modified (meth)acrylate such as caprolactone-modified trimethylolpropane tri(meth)acrylate; and caprolactam-modified (meth)acrylate such as caprolactam-modified dipentaerythritol hexa(meth)acrylate.

Among these, ethylene oxide-modified (meth)acrylate and propylene oxide-modified (meth)acrylate are preferable, and modified (meth)acrylate having 3 or more ethylene oxide groups or propylene oxide groups is more preferable. The ethylene oxide group and propylene oxide group have high polarity and high affinity with hemiaminal and hemiacetal. Therefore, the (meth) acrylate having these functional groups does not easily pass hemiaminal and hemiacetal through the reticular hydrocarbon chain generated by crosslinking, and thus it is possible to suppress the odor from the cured film.

Further, the (meth) acrylate having an alicyclic structure or an aromatic ring is preferable. The alicyclic structure or the aromatic ring has a bulky structure, and can fill the gaps formed in the reticular hydrocarbon chain. Therefore, the (meth)acrylate having these can further suppress the movement of substances in the cured film, and can further reduce the odor and migration amount from the cured film.

The (meth)acrylate may be a polymerizable oligomer. Examples of the (meth)acrylate, which is a polymerizable oligomer, include epoxy (meth) acrylate oligomer, aliphatic urethane (meth)acrylate oligomer, aromatic urethane (meth) acrylate oligomer, polyester (meth)acrylate oligomer, and linear (meth)acrylic oligomer.

1-2. Radical Polymerization Initiator

The radical polymerization initiator is a compound that initiates polymerization and crosslinking of the radical polymerizable compound by generating a radical by irradiation with active rays.

The content of the radical polymerization initiator may be within a range in which the ink can be sufficiently cured. For example, the content of the radical polymerization initiator can be 0.1 mass % to 10 mass % with respect to the total mass of the inkjet ink.

Only one kind of the radical polymerization initiator may be contained in the ink of the present invention, and two or more kinds thereof may be contained in the ink.

The radical polymerization initiator includes a radical polymerization initiator (aldehyde producing initiator) that produces aldehyde by irradiation with active rays. The aldehyde derived from the aldehydes producing initiator causes odor of the cured film, but odor derived from these aldehydes can be reduced by the inkjet ink containing the odor material scavenger.

Examples of the aldehyde producing initiator include 2-hydroxy-2-methyl-1-phenylpropane-1-one (IRGACURE 1173 and the like, manufactured by BASF Corporation ("IRGACURE" is a registered trademark of the same company)), 2-hydroxy-1-{4-[4-(2-hydroxy-2-methylpropionyl)-benzyl] phenyl}-2-methyl-propan-1-one (IRGACURE 127 and the like, manufactured by BASF Corporation), 1-[4-(2-hydroxyethoxy)-phenyl]-2-hydroxy-2-methyl-1-propan-1-one (IRGACURE 2959 and the like, manufactured by BASF Corporation), 2,2-dimethoxy-1,2-diphenylethan-1-one (IRGACURE 651 and the like, manufactured by BASF Corporation), benzyl dimethyl ketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenyl ketone, 2-methyl-2-morpholino(4-thiomethylphenyl) propan-1-one, 2-benzyl-2-dimethylamino-1-(4-morpholinophenyl)-butanone, benzoin, benzoin methyl ether, benzoin isopropyl ether, 2,4,6-trimethylbenzoin diphenylphosphine oxide, bis(2,4,6-trimethylbenzoyl)-phenylphosphine oxide, and benzyl and methyl-phenyl glyoxy esters.

The content of the aldehyde producing initiator can be, for example, 0.01 mass % to 10 mass % with respect to the total mass of the inkjet ink. From the viewpoint of reducing an odor by sufficiently polymerizing and crosslinking the above-mentioned radical polymerizable compound and precipitating the unreacted aldehyde producing initiator, the content of the aldehyde producing initiator is preferably 0.1 mass % to 6.0 mass %, and more preferably 0.1 mass % to 4.0 mass % with respect to the total mass of the inkjet ink.

Among these, the aldehyde producing initiator is preferably a compound which has a keto group as a cutting site and in which a carbon atom constituting the keto group is directly bonded to a mesityl group (hereinafter, simply referred to as "a mesityl initiator").

Hemiaminal and hemiacetal produced by the reaction of the aldehyde generated by decomposition of the aldehyde producing initiator and the odor material scavenger are unstable. The residue $R_1$ or $R_3$ derived from the odor material scavenger in Formulae (1) and (2) are easily detached by nucleophilic attacks from the opposite side thereof. Since the product resulting from the elimination of the residue $R_1$ or $R_3$ from the above hemiaminal or hemiacetal may have a lower molecular weight and may lose the bending structure in the molecule, the product easily passes through the gaps between the reticular hydrocarbon chains generated by the polymerization and crosslinking of the polyfunctional radical polymerizable compound, and thus easily precipitates from the cured film.

However, it is considered that when the aldehyde producing initiator is a mesityl initiator, since the residues $R_2$ and $R_4$ in Formulae (1) and (2) have an alkyl group at an ortho position of a carbon atom directly bonded to these residues, the nucleophilic attack on the carbon atom is sterically hindered, and the elimination of the substituent is suppressed. Therefore, when the aldehyde producing initiator is a mesityl initiator, it is possible to suppress the odor and the migration due to the nucleophilic attack.

Examples of the mesityl initiator, which is a photoradical initiator, include 2,4,6-trimethylbenzoin diphenylphosphine oxide, bis(2,4,6-trimethylbenzoyl)-phenylphosphine oxide, and ethyl phenyl (2,4,6-trimethylbenzoyl) phosphinate.

From the viewpoint of suppressing the odor and migration from the cured film by suppressing the elimination of the residue $R_1$ or $R_3$ due to the above-mentioned nucleophilic attack, the content of the mesityl initiator is preferably 1 mass % to 6 mass % with respect to the total mass of the inkjet ink.

The radical polymerization initiator may contain a compound other than the aldehyde producing initiator.

Examples of the compound other than the aldehyde producing initiator include hydrogen abstraction type radical initiators, such as benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl) benzophenone, 3,3'-dimethyl-4-methoxybenzophenone, 2-isopropylthioxanthone, 2,4-dimethylthioxanthone, 2,4-diethylthioxanthone, 2,4-dichlorothioxanthone, Michler's ketone, 4,4'-diethylaminobenzophenone, 10-butyl-2-chloroacridone, 2-ethylanthraquinone, 9,10-phenanthrenequinone, camphorquinone, and 2,4-diethyloxanthen-9-one.

1-3. Color Material

The color material contains a dye and a pigment.

The content of the color material is set such that the absorbance of the inkjet ink to light having a wavelength of 365 nm to 395 nm is 400 to 1000. When the absorbance of the inkjet ink is within the above range, the irradiated active ray do not sufficiently reach the entire radical polymerization initiator, and thus the unreacted radical polymerization initiator remains. However, when the content of the odor material scavenger is lower than the content of the aldehyde producing initiator, it is possible to suppress the occurrence of the odor derived from the odor material scavenger remaining without reacting with aldehyde.

JP 2009-203408 A and JP 2015-533876 A disclose that a specific compound is contained in a colorless coating composition not containing a color material such as a pigment, and thus it is possible to deodorize the cured film formed from the coating composition. However, according to the findings of the present inventors, when a color material, particularly, a pigment is contained in the coating composition disclosed in JP 2009-203408 A and JP 2015-533876 A, the deodorizing effect does not increase to an expected degree. This is considered that the active rays applied onto the active ray curable ink is absorbed by the coloring material, the amount of light is reduced in the ink, the radical polymerization initiator does not sufficiently fissure, the non-fissured radical polymerization initiator remains or an odor material scavenger which could not react with aldehyde remains, and these compounds precipitate from the cured film. In contrast, the above inkjet ink can sufficiently suppress the precipitation of these compounds due to the dense crosslinked structure of the odor material scavenger and the polyfunctional radical polymerizable compound.

From the viewpoint of obtaining an image having good weather resistance, the color material is preferably a pigment. The pigment can be selected from, for example, yellow pigment, red or magenta pigment, blue or cyan pigment, and black pigment depending on the color of an image to be formed.

Examples of yellow pigment include C.I. Pigment Yellow (hereinafter also simply referred to as "PY") 1, PY 3, PY 12, PY 13, PY 14, PY 17, PY 34, PY 35, PY 37, PY 55, PY 74, PY 81, PY 83, PY 93, PY 94, PY 95, PY 97, PY 108, PY 109, PY 110, PY 137, PY 138, PY 139, PY 153, PY 154, PY 155, PY 157, PY 166, PY 167, PY 168, PY 180, PY 185, and PY 193.

Examples of red or magenta pigment include C.I. Pigment Red (hereinafter also simply referred to as "PR") 3, PR 5, PR 19, PR 22, PR 31, PR 38, PR 43, PR 48:1, PR 48:2, PR 48:3, PR 48:4, PR 48:5, PR 49:1, PR 53:1, PR 57:1, PR 57:2, PR 58:4, PR 63:1, PR 81, PR 81:1, PR 81:2, PR 81:3, PR 81:4, PR 88, PR 104, PR 108, PR 112, PR 122, PR 123, PR 144, PR 146, PR 149, PR 166, PR 168, PR 169, PR 170, PR 177, PR 178, PR 179, PR 184, PR 185, PR 208, PR 216, PR 226, and PR 257; C.I. Pigment Violet (hereinafter also simply referred to as "PV") 3, PV 19, PV 23, PV 29, PV 30, PV 37, PV 50, and PV 88; and C.I. Pigment Orange (hereinafter also simply referred to as "PO") 13, PO 16, PO 20, and PO 36.

Examples of blue or cyan pigment include C.I. Pigment Blue (hereinafter also simply referred to as "PB") 1, PB 15, PB 15:1, PB 15:2, PB 15:3, PB 15:4, PB 15:6, PB 16, PB 17-1, PB 22, PB 27, PB 28, PB 29, PB 36, and PB 60. Examples of green pigment include C.I. Pigment Green (hereinafter also simply referred to as "PG") 7, PG 26, PG 36, and PG 50. Examples of black pigment include C.I. Pigment Black (hereinafter also simply referred to as "PBk") 7, PBk 26, and PBk 28.

1-4. Odor Material Scavenger

The odor material scavenger is a compound having a primary amine group or secondary amine group in a molecule and having a molecular weight of 1000 or less (amine-based scavenger), or is a compound having a hydroxyl group where α-position carbon is primary carbon or a compound having an aromatic ring-substituted hydroxyl group and having a molecular weight of 1000 or less (OH-based scavenger).

Further, the odor material scavenger can be a compound selected from any group consisting of the above-mentioned compounds. For example, the odor material scavenger can be any compound selected from (1) the group consisting of a compound having a primary amine group in a molecule and having a molecular weight of 1000 or less, a compound having a secondary amine group in a molecule and having a molecular weight of 1000 or less, a compound having a hydroxyl group where α-position carbon is primary carbon and having a molecular weight of 1000 or less, and a compound having an aromatic ring-substituted hydroxyl group and having a molecular weight of 1000 or less, (2) the group consisting of a compound having a primary amine group in a molecule and having a molecular weight of 1000 or less, a compound having a secondary amine group in a molecule and having a molecular weight of 1000 or less, and a compound having a hydroxyl group where α-position carbon is primary carbon and having a molecular weight of 1000 or less, (3) the group consisting of a compound having a primary amine group in a molecule and having a molecular weight of 1000 or less, a compound having a secondary amine group in a molecule and having a molecular weight of 1000 or less, and a compound having an aromatic ring-substituted hydroxyl group and having a molecular weight of 1000 or less, (4) the group consisting of a compound having a primary amine group in a molecule and having a molecular weight of 1000 or less, a compound having a hydroxyl group where α-position carbon is primary carbon and having a molecular weight of 1000 or less, and a compound having an aromatic ring-substituted hydroxyl group and having a molecular weight of 1000 or less, (5) the group consisting of a compound having a secondary amine group in a molecule and having a molecular weight of 1000 or less, a compound having a hydroxyl group where α-position carbon is primary carbon and having a molecular weight of 1000 or less, and a compound having an aromatic ring-substituted hydroxyl group and having a molecular weight of 1000 or less, (6) the group consisting of a compound having a primary amine group in a molecule and having a molecular weight of 1000 or less, and a compound having a hydroxyl group where α-position carbon is primary carbon and having a molecular weight of 1000 or less, (7) the group consisting of a compound having a primary amine group in a molecule and having a molecular weight of 1000 or less, and a compound having an aromatic ring-substituted hydroxyl group and having a molecular weight of 1000 or less, (8) the group consisting of a compound having a secondary amine group in a molecule and having a molecular weight of 1000 or less, and a compound having a hydroxyl group where α-position carbon is primary carbon and having a molecular weight of 1000 or less, and (9) the group consisting of a compound having a secondary amine group in a molecule and having a molecular weight of 1000 or less, and a compound having an aromatic ring-substituted hydroxyl group and having a molecular weight of 1000 or less.

The odor material scavenger reacts with aldehyde to produce hemiaminal or hemiacetal. As described above, it is considered that the hemiaminal or hemiacetal cannot pass through the gaps between the reticular hydrocarbon chains formed by polymerization and crosslinking of the radical polymerizable compound and hardly precipitate outside the cured film.

In addition, since the odor material scavenger has a molecular weight of 1000 or less, it easily moves in the cured film, and is easy to capture aldehyde. From the above-mentioned viewpoint, preferably, the odor material scavenger is a monomer, and has a molecular weight of 500 or less.

From the viewpoint of enhancing the reactivity of the odor material scavenger and aldehyde, it is preferable that the odor material scavenger does not have a radical polymerizable functional group or a cationic polymerizable functional group in a molecule.

The content of the odor material scavenger is preferably 0.1 mass % to 8.0 mass % with respect to the total mass of the inkjet ink. When the content of the odor material scavenger is 0.1 mass % or more, the aldehyde produced from the aldehyde producing initiator by irradiation with active rays sufficiently reacts with the odor material scavenger, and thus the odor due to the precipitation of aldehyde can be reduced. When the content of the odor material scavenger is 8.0 mass % or less, it is possible to reduce the odor from the cured film due to the precipitation of the odor material scavenger remaining without reacting with aldehyde. From the viewpoint of making it difficult to cause a reverse reaction from hemiaminal or hemiacetal to aldehyde, it is preferable that the content of the odor material scavenger is higher. Meanwhile, from the viewpoint of suppressing the deterioration of storage stability of ink by allowing the odor material scavenger having a polar group to deteriorate the dispersability of a pigment, it is preferable that the content of the odor material scavenger does not excessively increase. From the above viewpoint, the content of the odor material scavenger is preferably 0.4 mass % to 5.0 mass %, more preferably 0.3 mass % to 4.0 mass %, and further preferably 0.8 mass % to 4.0 mass %.

The amine-based scavenger reacts with aldehyde to produce hemiaminal.

Further, primary amine or secondary amine has a hydrogen atom not substituted with a hydrocarbon group. Therefore, the compound having a primary amine group or secondary amine group in a molecule makes it difficult for steric hindrance to occur, and reacts with aldehyde to easily produce hemiaminal.

Examples of the amine-based scavenger include a compound having a primary amine group in a molecule and having a molecular weight of 1000 or less and a compound having a secondary amine group in a molecule and having a molecular weight of 1000 or less. The amine-based scavenger may have both primary amine and secondary amine in a molecule.

Specific examples of the amine-based scavenger include monoamines such as aminomethane, aminoethane, 1-aminopropane, 2-aminopropane, 1-aminobutane, 2-aminobutane, 1-aminopentane, 2-aminopentane, 3-aminopentane, isoamylamine, 1-aminohexane, 1-aminoheptane, 2-aminoheptane, 2-octylamine, 1-aminononane, 1-aminodecane, 1-aminododecane (laurylamine), 1-aminotridecane, 1-aminohexadecane, 1-aminotetradecane (myristylamine), 1-aminopentadecane, cetylamine, oleylamine, cocoalkylamine, allylamine, stearylamine, aminocyclopropane, aminocyclobutane, aminocyclopentane, aminocyclohexane, aminocyclododecane, 1-amino-2-ethylhexane, 1-amino-2-methylpropane, 2-amino-2-methylpropane, 3-amino-1-propene, 3-aminomethylheptane, 3-isopropoxypropylamine, 3-butoxypropylamine, 3-isobutoxypropylamine, 2-ethylhexyloxypropylamine, 3-decyloxypropylamine, 3-lauryloxypropylamine, 3-myristyloxypropylamine, diethylamine, di-n-butylamine, di-n-hexylamine, di-n-octylamine, diisononylamine, monoethanolamine, diethanolamine, 2-amino-2-methyl-1-propanol, α-(2-aminoethyl)diphenylmethane, and bis(4-aminocyclohexyl) methane; linear aliphatic alkylenediamines such as ethylenediamine, 1,3-propanediamine, 1,4-butanediamine, 1,5-pentanediamine, 1,6-hexanediamine, 1,7-heptanediamine, 1,8-octanediamine, 1,9-nonanediamine, and 1,10-decanediamine; aliphatic alkylenediamines such as N,N'-dimethylethylenediamine, N,N'-dimethyl-1,3-propanediamine, N,N'-dimethyl-1,4-butanediamine, N,N'-dimethyl-1,5-pentanediamine, N,N'-dimethyl-1,6-hexanediamine, N,N'-dimethyl-1,7-heptanediamine, and N,N'-1,8-octanediamine; branched aliphatic alkylenediamines such as butyl-1,2-ethanediamine, 1,1-di methyl-1,4-butanedi amine, 1-ethyl-1,4-butanedi amine, 1,2-dimethyl-1,4-butanedi amine, 1,3-dimethyl-1,4-butanediamine, 1,4-dimethyl-1,4-butanediamine, and 2,3-dimethyl-1,4-butanediamine; polyethylene amines represented by General Formula $NH_2(CH_2CH_2NH)_nH$ such as diethylenetriamine, triethylenetetramine, and tetraethylenepentamine; alicyclic diamines such as cyclohexanediamine, methylcyclohexanediamine, isophoronediamine, norbornanedimethylamine, tricyclodecanedimethylamine, and menthendiamine; amines having an ether group, such as bis(2-methylaminoethyl)ether, 1,2-bis(2-methylaminoethoxy) ethane, bis[2-(2-methylaminoethoxy)ethyl] ether, diethylene glycol bis(3-aminopropyl) ether, ethylene glycol bis(3-aminopropyl) ether, 1,4-butanediol bis(3-aminopropyl) ether, 1,2-bis(2-aminoethoxy) ethane, 1,1,1-diamino-3,6,9-trioxaundecane, and 1,3-bis(3-aminopropyl) tetramethyldisiloxane.

Since the aromatic substituted amine has a low electron density of a noncovalent electron pair in an aromatic ring, it hardly interacts with a pigment, and hardly deteriorates pigment dispersibility compared to an aliphatic amine. Therefore, from the viewpoint of enhancing the storage stability of ink, the odor material scavenger is preferably an amine-based scavenger which is an aromatic substituted amine. However, from the viewpoint of preventing storage stability from being inversely deteriorated by lowering the dispersability of pigment by the reaction of the aromatic substituted amine and an absorbing group on the surface of pigment, the content of the amine-based scavenger, which is the above aromatic substituted amine, is preferable 5.0 mass % or less, and more preferably 4.0 mass % or less, with respect to the total mass of the inkjet ink.

Further, since the aromatic substituted amine has a bulky aromatic ring, even after becoming hemiaminal, and when remaining without reacting with aldehyde, it is difficult for the aromatic substituted amine to pass through the gaps between the reticular hydrocarbon chains formed by the polymerization and crosslinking of the radical polymerizable compound, and it is difficult for the aromatic substituted amine to precipitate from the cured film, so that the effect of reducing an odor from the cured film is high.

Examples of the amine-based scavenger which is the above aromatic substituted amine include compounds of toluidines, xylidines, cumidines (isopropylanilines), hexylanilines, nonylanilines, and dodecylanilines; and aniline having an amine group added to a benzene skeleton and a compound having a functional group such as an alkyl group, an alkoxy group, a carboxyl group, an amide group, an ester group or an aromatic group added to any one of o, m and p positions of aniline. Examples of the compound having a functional group added to aniline include o-aminotoluene, m-aminotoluene, p-aminotoluene, o-benzylaniline, p-benzylaniline, 1-anilinonaphthalene, 1-aminoanthraquinone, 2-aminoanthraquinone, 1-aminoanthracene, 2-aminoanthracene, 5-aminoisoquinoline, o-aminodiphenyl, 4-aminodiphenyl ether, 2-aminobenzophenone, 4-aminobenzophenone, o-aminoacetophenone, m-aminoacetophenone, p-aminoacetophenone, methylaniline, diphenylamine, N-phenyl-1-naphthylamine, 2-aminobenzamide, and 5-aminosalicylic acid.

From the viewpoint of reducing steric hindrance and facilitating the capturing of aldehyde, the aromatic amine is preferably an aromatic primary amine.

The OH-based scavenger reacts with aldehyde to produce hemiacetal.

In the compound having a hydroxyl group where α-position carbon is primary carbon and the compound having an aromatic ring-substituted hydroxyl group, carbon located adjacent to carbon bonded to a hydroxyl group is not substituted with a hydrocarbon group or the like. Therefore, these compounds are difficult to cause steric hindrance, and react with aldehydes to easily produce hemiacetals.

Examples of the OH-based scavenger, which is a compound having a hydroxyl group where α-position carbon is primary carbon, include monofunctional alcohols having a branched alkyl group such as 2-butanol, isobutanol, tert-butanol, 2,2-pentanol, 3-pentanol, isopentanol, 2-methyl-1-butanol, 2-methyl-3-butanol, 2,2-dimethyl-1-propanol, tert-pentanol, 2-hexanol, 3-hexanol, isohexanol, 2-methyl-2-pentanol, 2-methyl-1-pentanol, 3-methyl-1-pentanol, 2-ethyl-1-butanol, 3,3-dimethyl-1-butanol, 2-heptanol, 3-heptanol, 4-heptanol, 5-methy-1-hexanol, 4-methyl-1-hexanol, 3-methyl-1-hexanol, 2-ethyl-2-methyl-1-butanol, isooctanol, 2-ethyl-1-hexanol, isononanol, 3.5.5-trimethyl-hexanol, isodecanol, isoundecanol, 5-ethyl-2-nonanol, isododecanol, isotridecanol, isotetradecanol, isopentadecanol, isohexadecanol, 2-hexyldecanol, 3,9-diethyl-6-tridecanol, 2-isoheptylisoundecanol, 2-octyldodecanol, 2-decyltetradecanol, and 2-methylstearyl alcohol; aromatic monofunctional alcohols such as benzyl alcohol, methylphenyl methanol, methoxyphenyl methanol, ethyl phenyl methanol, ethoxyphenyl methanol, butyl phenyl methanol, butoxyphenyl methanol, phenyl ethanol, methyl phenyl ethanol, methoxyphenyl ethanol, ethyl phenyl ethanol, ethoxyphenyl ethanol, butyl phenyl ethanol, butoxyphenyl ethanol, phenyl propanol, methyl phenyl propanol, methoxyphenyl propanol, ethyl phenyl propanol, ethoxyphenyl propanol, butyl phenyl propanol, butoxyphenyl propanol, phenyl butanol, methyl phenyl butanol, methoxyphenyl butanol, ethyl phenyl butanol, ethoxyphenyl butanol, butyl phenyl butanol, and butoxyphenyl butanol; and dihydric alcohol having 2 to 20 carbon atoms, trihydric alcohol having 3 to 20 carbon atoms, and tetrahydric to octahydric alcohols having 5 to 20 carbon atoms.

Examples of the dihydric alcohol having 2 to 20 carbon atoms include linear aliphatic diol, branched aliphatic diol, and alicyclic diol. Examples of the linear aliphatic diol and the branched aliphatic diol include alkylene glycols such as ethylene glycol, 1,2-propylene glycol, 1,3-propylene glycol, 1,3-butanediol, 1,4-butanediol, 1,6-hexanediol, 2,2,4-trimethyl-1,3-pentanediol, and neopentyl glycol. Examples of the alicyclic diol include cycloalkylene glycols such as cyclohexane diol and cyclohexane dimethanol.

Examples of the trihydric alcohol having 3 to 20 carbon atoms include aliphatic triols including alkane triols such as glycerin, trimethylol propane, trimethylol ethane, and hexane triol.

Examples of the tetrahydric to octahydric alcohols having 5 to 20 carbon atoms include aliphatic polyols and saccharides. Examples of the aliphatic polyols include alkane polyols including pentaerythritol, sorbitol, mannitol, sorbitan, diglycerin and dipentaerythritol; and alkane triols or intermolecular dehydration products of alkane polyols. Examples of the saccharides include sucrose, glucose, mannose, fructose, methyl glucoside, and derivatives thereof.

Examples of the OH-based scavenger which is a compound having an aromatic substituted hydroxyl group include a compound having a phenolic hydroxyl group; and nonylphenol, n-octylphenol, n-dodecylphenol, n-stearylphenol, p-chlorophenol, p-bromophenol, o-phenylphenol, n-butyl-p-hydroxybenzoate, n-octyl-p-hydroxybenzoate, benzyl p-hydroxybenzoate, dihydroxybenzoate or its esters (for example, 2,3-dihydroxybenzoic acid and methyl 3,5-dihydroxybenzoate), resorcinol, gallic acid, dodecyl gallate, ethyl gallate, butyl gallate, propyl gallate, 2,2-bis(4-hydroxyphenyl) propane, 4,4-dihydroxydiphenyl sulfone, 1,1-bis(4-hydroxyphenyl) ethane, 2,2-bis(4-hydroxy-3-methylphenyl) propane, bis(4-hydroxyphenyl) sulfide, 1-phenyl-1,1-bis(4-hydroxyphenyl) ethane, 1,1-bis(4-hydroxyphenyl)-3-methylbutane, 1,1-bis(4-hydroxyphenyl)-2-methylpropane, 1,1-bis(4-hydroxyphenyl) n-hexane, 1,1-bis(4-hydroxyphenyl) n-nonane, 1,1-bis(4-hydroxyphenyl) n-decane, 1,1-bis(4-hydroxyphenyl) n-dodecane, 2,2-bis(4-hydroxyphenyl) n-heptane, 2,2-bis(4-hydroxyphenyl) n-nonane, 2,4-dihydroxyacetophenone, 2,5-dihydroxyacetophenone, 2,6-dihydroxyacetophenone, 3,5-dihydroxyacetophenone, 2,3,4-trihydroxyacetophenone, 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, 2,3,4,4'-tetrahydroxybenzophenone, 2,4'-biphenol, 4,4'-biphenol, 4-[(4-hydroxyphenyl) methyl]-1,2,3-benzenetriol, 4,4',4"-ethylidene trisphenol, methylene tris-p-cresol, and hesperidin. Examples of the compound having a phenolic hydroxyl group include phenol, o-cresol, 2,6-xylenol, p-cresol, m-cresol, o-ethylphenol, 2,4-xylenol, 2,5-xylenol, m-ethylphenol, 2,3-xylenol, mesitol, 3,5-xylenol, p-tertiary butylphenol, catechol, p-tertiary aminophenol, resorcinol, p-octylphenol, p-phenylphenol, bisphenol A, bisphenol F, bisphenol AF, and biphenol.

The OH-based scavenger which is a compound having an aromatic substituted hydroxyl group, similarly to the aromatic substituted amine, can inhibit the aggregation of a pigment and make the color developing properties more satisfactory.

1-5. Gelling Agent

The gelling agent may be any compound capable of temporarily fixing (pinning) the liquid droplets of the ink landed on a recording medium by gelation. When the ink landed on the recording medium is pinned by gelation, the wet spreading of the ink is suppressed, and adjacent dots are difficult to coincide, so that it is possible to form a higher definition image. When the ink is in the gel state, the entering of oxygen in the environment into ink droplets is suppressed, so that it is possible to form a higher definition image at higher speed. Only one kind of the gelling agent may be contained in the inkjet ink, and two or more kinds of the gelling agent may also be contained in the inkjet ink.

The content of the gelling agent is preferably 1.0 mass % to 10.0 mass % with respect to the total mass of the ink. When the content of the gelling agent is 1.0 mass % or more, it is possible to sufficiently enhance the pinning properties of the ink and to form a higher definition image. When the content of the gelling agent is 10.0 mass % or less, it is difficult for the gelling agent to precipitate on the surface of the formed image, so that the glossiness of the image can be made closer to the glossiness of the image by another ink, and the ink ejecting properties from an inkjet head can be further improved. From the above viewpoint, the content of the gelling agent in the inkjet ink is preferably 1.0 mass % to 5.0 mass %, more preferably 1.2 mass % to 5.0 mass %, and further more preferably 1.5 mass % to 3.0 mass %.

It is preferable that the gelling agent forms a structure (hereinafter, this structure is referred to as "a card house structure") in which a radical polymerizable compound is contained in a three-dimensional space formed by the gelling agent crystallized into a plate shape by the crystallization in the ink at a temperature lower than the gelation temperature of the ink.

When the card house structure is formed, a reticular structure due to the card house structure is formed in an overlapping manner in addition to a dense crosslinking structure due to a polyfunctional radical polymerizable compound, so that a denser reticular structure is formed in the cured film. Therefore, hemiaminal or hemiacetal or other compounds with small molecular weights are less likely to pass through the above dense reticular structure, and the odor due to migration from the cured film is further reduced.

Further, when the card house structure is formed, a liquid radical polymerizable compound is retained in the space, so that ink droplets are difficult to wet and spread, and the pinning properties of the ink are further enhanced. When the pinning properties of the ink are enhanced, it is difficult for the ink droplets landed on a recording medium to coalesce with each other, and thus it is possible to form a higher definition image.

The gelation temperature refers to a temperature at which when the ink solated or liquefied by heating is cooled, the ink undergoes phase transition from sol to gel, and the viscosity of the ink rapidly changes. Specifically, when the solated or liquefied ink is cooled while measuring the viscosity thereof with a rheometer (for example, MCR 300, manufactured by Physica Corporation), the temperature at which the viscosity rapidly increases may be referred to as the gelation temperature of the ink.

From the viewpoint of making it easier to form the card house structure, it is preferable that the radical polymerizable compound dissolved in the ink is compatible with the gelling agent. In contrast to this, when the radical polymerizable compound dissolved in the ink and the gelling agent are phase-separated, it may be difficult to form the card house structure.

Examples of the gelling agent suitable for forming the card house structure due to crystallization include ketone wax, ester wax, petroleum wax, vegetable wax, animal wax, mineral wax, hardened castor oil, modified wax, higher fatty acids, higher alcohols, fatty acid amide including hydroxystearic acid, N-substituted fatty acid amide and special fatty acid amide, higher amines, esters of sucrose fatty acids, synthetic waxes, dibenzylidene sorbitol, dimer acid, and dimer diol.

Examples of the ketone wax include dilignoceryl ketone, dibehenyl ketone, distearyl ketone, diacosyl ketone, dipalmityl ketone, dilauryl ketone, dimyristyl ketone, myristyl palmityl ketone, and palmityl stearyl ketone.

Examples of the ester wax include behenyl behenate, icosyl icosanate, stearyl stearate, palmityl stearate, cetyl palmitate, myristyl myristate, cetyl myristate, myricyl serotinate, stearyl stearate, oleyl palmitate, glycerin fatty acid ester, sorbitan fatty acid ester, propylene glycol fatty acid ester, ethylene glycol fatty acid ester, and polyoxyethylene fatty acid ester.

The commercially available products of the ester wax include EMALEX series manufactured by Nihon Emulsion Co., Ltd. ("EMALEX" is a registered trade mark of this company), and RIKEMAR series and POEM series manufactured by Riken Vitamin Co., Ltd. ("RIKEMAR" and "POEM" are registered trademarks of this company).

Examples of the petroleum wax include petroleum wax including paraffin wax, microcrystalline wax, and petrolactam.

Examples of the vegetable wax include candelilla wax, carnauba wax, rice wax, tree wax, jojoba oil, jojoba solid wax, and jojoba ester.

Examples of the animal wax include bees wax, and lanolin and whale wax.

Examples of the mineral wax include montan wax and hydrogenated wax.

Examples of the modified wax include montan wax derivatives, paraffin wax derivatives, microcrystalline wax derivatives, 12-hydroxystearic acid derivatives, and polyethylene wax derivatives.

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

Examples of hydroxystearic acid include 12-hydroxystearic acid.

Examples of the fatty acid amide include lauric acid amide, stearic acid amide, behenic acid amide, oleic acid amide, erucic acid amide, ricinoleic acid amide, and 12-hydroxystearic acid amide.

Examples of commercially available products of fatty acid amides include NIKKA AMIDE series manufactured by Nippon Kasei Chemical Co., Ltd. ("NIKKA AMIDE" is a registered trademark of this company), ITOWAX series manufactured by ITOH OIL CHEMICALS CO., LTD., and FATTYAMID series manufactured by Kao Corporation.

Examples of the N-substituted fatty acid amide include N-stearyl stearic acid amide and N-oleyl palmitic acid amide.

Examples of the special fatty acid amide include N,N'-ethylenebisstearylamide, N,N'-ethylene-bis-12-hydroxystearylamide, and N,N'-xylylene bisstearylamide.

Examples of the higher amine include dodecylamine, tetradecylamine, and octadecylamine.

Examples of esters of sucrose fatty acid include sucrose stearic acid and sucrose palmitic acid.

Examples of commercially available products of esters of sucrose fatty acid include RYOTO Sugar Ester Series manufactured by Mitsubishi Chemical Foods Corporation ("RYOTO" is a registered trademark of this company).

Examples of the synthetic wax include polyethylene wax and α-olefin maleic anhydride copolymer wax.

Examples of commercially available products of the synthetic wax include UNILIN series manufactured by Baker-Petrolite Corporation ("UNILIN" is a registered trademark of this company).

Examples of the dibenzylidene sorbitol include 1,3: 2,4-bis-O-benzylidene-D-glucitol.

Examples of commercially available products of the dibenzylidene sorbitol include GELOL D manufactured by New Japan Chemical Co., Ltd. ("GELOL" is a registered trademark of this company).

Examples of commercially available products of the dimer diol include PRIPOR series manufactured by CRODA Corporation ("PRIPOR" is a registered trademark of this company).

From the viewpoint of further reducing the migration amount of the unreacted radical polymerizable compound, the gelling agent is preferably a linear or branched hydrocarbon group having 14 or more carbon atoms. When the number of carbon atoms in the hydrocarbon group is 14 or more, the crystallinity of the gelling agent is further enhanced, and a more sufficient space is formed in the card house structure. Therefore, the radical polymerizable compound tends to be sufficiently contained in the space, the unreacted radical polymerizable compound is difficult to precipitate from the cured film, and the reactivity of monomers increases and residual monomers decreases, so that the migration can be suppressed.

Further, from the viewpoint of further reducing the migration amount of the odor material scavenger, the gelling agent is preferably a ketone wax represented by Formula (G1) below and an ester wax represented by Formula (G2) below. Since the ketone wax represented by Formula (G1) and the ester wax represented by Formula (G2) are easy to take the card house structure, the migration of hemiaminal, hemiacetal and other compounds having a low molecular weight from the cured film can be reduced. Only one of the ketone wax represented by Formula (G1) and the ester wax represented by Formula (G2) may be contained in the inkjet ink, and two or more kinds thereof may also be contained in the inkjet ink. Further, only one of the ketone wax represented by Formula (G1) and the ester wax represented by Formula (G2) may be contained in the inkjet ink, and, from the viewpoint of easily controlling the card house structure, it is preferable that both of them are contained in the inkjet ink.

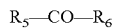 Formula (G1):

In Formula (G1), all of $R_5$ and $R_6$ are linear hydrocarbon groups which may have a branched chain and each of which has 14 to 25 carbon atoms.

 Formula (G2):

In Formula (G2), all of $R_7$ and $R_8$ are linear hydrocarbon groups which may have a branched chain and each of which has 14 to 25 carbon atoms.

Since the ketone wax represented by Formula (G1) or the ester wax represented by Formula (G2) contains a hydrocarbon group having 14 or more carbon atoms, the crystallinity of the gelling agent is further enhanced, and a more sufficient space is formed in the card house structure. Therefore, the radical polymerizable compound tends to be sufficiently contained in the space, and the pinning properties of the ink further increase. Further, since the number of carbon atoms in the linear or branched hydrocarbon group is 25 or less, the solation temperature of the ink does not excessively rise, so that it is not required to excessively heat the ink when ejecting the ink. From the above viewpoint, it is particularly preferable that $R_5$ and $R_6$ are linear hydrocarbon groups having 11 or more and less than 23 carbon atoms.

Further, from the viewpoint of increasing the gelation temperature of the ink and rapidly gelling the ink after landing, $R_5$ or $R_6$, or $R_7$ or $R_8$ is preferably a saturated hydrocarbon group having 11 or more and less than 23 carbon atoms. From the above viewpoint, both $R_5$ and $R_6$ or both $R_7$ an $R_8$ are more preferably saturated hydrocarbon groups having 11 or more and less than 23 carbon atoms.

Examples of the ketone wax represented by Formula (G1) include dilignoceryl ketone (carbon number: 23-24), dibehenyl ketone (carbon number: 21-22), distearyl ketone (carbon number: 17-18), dieicosyl ketone (carbon number: 19-20), dipalmityl ketone (carbon number: 15-16), dimyristyl ketone (carbon number: 13-14), dilauryl ketone (carbon number: 11-12), lauryl myristyl ketone (carbon number: 11-14), lauryl palmityl ketone (11-16), myristyl palmityl ketone (13-16), myristyl stearyl ketone (13-18), myristyl behenyl ketone (13-22), palmityl stearyl ketone (15-18), palmityl behenyl ketone (15-22), and stearyl behenyl ketone (17-22). The number of carbon atoms in the parenthesis represents the number of carbon atoms of each of the two hydrocarbon groups divided by a carbonyl group.

Examples of commercially available products of the ketone wax represented by Formula (G1) include 18-Pentatriacontanon manufactured by Alfa Aeser Co. Ltd., Hentriacontan-16-on manufactured by Alfa Aeser Co. Ltd., and KAOWAX T1 manufactured by Kao Corporation ("KAOWAX" is a registered trademark of this company).

Examples of the fatty acid or ester wax represented by Formula (G2) include behenyl behenate (carbon number: 21-22), icosyl icosanate (carbon number: 19-20), stearyl stearate (carbon number: 17-18), palmityl stearate (carbon number: 17-16), lauryl stearate (carbon number: 17-12), cetyl palmitate (carbon number: 15-16), stearyl palmitate (carbon number: 15-18), myristyl myristate (carbon number: 13-14), cetyl myristate (carbon number: 13-16), octyldodecyl myristate (carbon number: 13-20), stearyl oleate (carbon number: 17-18), stearyl erucate (carbon number: 21-18), stearyl linoleate (carbon number: 17-18), behenyl oleate (carbon number: 18-22), and arachidyl linoleate (carbon number: 17-20). The number of carbon atoms in the parenthesis represents the number of carbon atoms of each of the two hydrocarbon groups divided by an ester group.

Examples of commercially available products of the ester wax represented by Formula (G2) include UNISTER M-2222SL and SPERMACETI manufactured by NOF Corporation ("UNISTER" is a registered trademark of this company), EXEPAR SS and EXEPAR MY-M manufactured by Kao Corporation ("EXEPAR" is a registered trademark of this company), EMALEX CC-18 and EMALEX CC-10 manufactured by Nihon Emulsion Co., Ltd., and AMREPS PC manufactured by KOKYU ALCOHOL KOGYO CO., LTD. ("AMREPS" is a registered trademark of this company). Since these commercially available products are often a mixture of two or more kinds, they may be separated, refined and then contained in the ink, as necessary.

1-6. Other Components

In addition to the above-mentioned components, the inkjet ink may contain other components including an ultraviolet absorber, a dispersant, a photosensitizer, a polymerization inhibitor, a surfactant, and the like as long as the odor from the cured film is not remarkably enhanced. Only one kind of these components may be contained in a specific gel ink, and two or more kinds thereof may also be contained in the specific gel ink.

Examples of the ultraviolet absorber includes a benzophenone compound, a benzotriazole compound, a salicylic acid ester compound, a hydroxyphenyl triazine compound, and a cyanoacrylate compound, which are well known as an ultraviolet absorber.

The dispersant can be used for enhancing the dispersibility of a pigment to sufficiently develop a color. Examples of the dispersant include hydroxyl group-containing carboxylic acid ester, a salt of long chain polyamino amide and high molecular weight acid ester, a salt of high molecular weight polycarboxylic acid, a salt of long chain polyamino amide and polar acid ester, high molecular weight unsaturated acid ester, a polymer copolymer, modified polyurethane, modified polyacrylate, a polyetherester type anionic activator, a naphthalene sulfonic acid formalin condensate salt, an aromatic sulfonic acid formalin condensate salt, polyoxyethylene alkyl phosphate ester, polyoxyethylene nonyl phenyl ether, and stearyl amine acetate, which are well known as a dispersant.

The content of the dispersant, for example, can be 20 mass % to 70 mass % with respect to the total mass of the pigment.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutyl cresol, cyclohexanone oxime cresol, guaiacol, o-isopropyl phenol, butyraldoxime, methyl ethyl ketoxime, and cyclohexanone oxime.

Examples of the surfactant include anionic surfactants such as dialkyl sulfosuccinates, alkyl naphthalene sulfonates, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; and silicone-based or fluorine-based surfactants.

It is preferable that the inkjet ink does not substantially contain a fragrance. For example, when forming an image on food packaging using the inkjet ink, if a fragrance precipitated from the cured film is transferred to food, there is a problem of losing the flavor of the food.

1-7. Physical Properties

From the viewpoint of further improving the ejectability from an inkjet head, the viscosity of the inkjet ink at 80° C. is preferably 3 mPa·s to 20 mPa·s. Further, from the viewpoint of sufficiently gelling the ink at the time of landing and lowering to normal temperature, the viscosity of the inkjet ink at 25° C. is preferably 1000 mPa·s or more.

The gelation temperature of the inkjet ink is preferably 40° C. to 70° C. When the gelation temperature of the ink is 40° C. or higher, the ink is rapidly gelled after landing on the recording medium, so that pinning properties become higher. When the gelation temperature of the ink is 70° C. or lower, it is difficult for the ink to be gelled at the time of ejection of the inkjet ink from an inkjet head having an inkjet temperature of about 80° C., so that it is possible to more stably eject the ink.

The viscosity of the inkjet ink at 80° C., the viscosity of the inkjet ink at 25° C., and the gelation temperature can be obtained by measuring the temperature change of dynamic viscoelasticity of the ink by a rheometer. In the present invention, these viscosities and gelation temperature are values obtained by the following method. The inkjet ink is heated to 100° C., the viscosity of the inkjet ink is measured by a stress control type rheometer MCR 301 (diameter of cone plate: 75 mm, cone angle: 1.0°) manufactured by Physica Corporation or a stress control type rheometer manufactured by Anton Paar Corporation, the ink is cooled to 20° C. under the conditions of a shear rate of 11.7 (1/s) and a temperature decrease rate of 0.1° C./s, so as to obtain a temperature change curve of viscosity. The viscosity at 80° C. and the viscosity at 25° C. are obtained by reading the viscosity at 80° C. and 25° C. respectively in the temperature change curve of viscosity. The gelation temperature is obtained as a temperature at which the viscosity becomes 200 mPa·s in the temperature change curve of the viscosity.

From the viewpoint of further improving the ejectability from the inkjet head, it is preferable that the average particle diameter of pigment particles is 0.08 µm to 0.5 µm, and the maximum particle diameter thereof is 0.3 µm to 10 µm. The average particle diameter of the pigment particles in the present invention is a value obtained by a dynamic light scattering method using Data Sizer Nano ZSP, manufactured by Malvern Co. Ltd. Since the concentration of the ink containing a color material is high and light is not transmitted by this measuring instrument, it is measured after diluting the ink by 200 times. The measurement temperature is set to room temperature (25° C.).

1-8. Preparation of Ink

The above-mentioned inkjet ink, for example, can be obtained by mixing the above-mentioned radical polymerizable compound, radical polymerization initiator and odor material scavenger, an optional color material, a gelling agent, and other components under heating. It is preferable that the obtained mixed solution is filtered with a predetermined filter. When preparing an inkjet ink containing a pigment and a dispersant, the mixing may be performed by preparing a pigment dispersion in which a pigment and a dispersant are dispersed in a solvent in advance and adding remaining components to the prepared pigment dispersion while heating.

The dispersion of a pigment and a dispersant can be performed by, for example, a ball mill, a sand mill, an attritor, a roll mill, an agitator, a Henschel mixer, a colloid mill, an ultrasonic homogenizer, a pearl mill, a wet jet mill, and a paint shaker.

2. Image Forming Method

The image forming method of the present invention can be performed in the same manner as a known image forming method in which the inkjet ink is ejected from an inkjet head and landed on a recording medium and then cured, except for using the above-described inkjet ink.

For example, the image forming method of the present invention includes a first process of ejecting the inkjet ink from nozzles of an inkjet head and landing the ejected inkjet ink on a recording medium and a second process of irradiating the droplets of the inkjet ink landed on the recording medium with active rays.

2-1. First Process

In the first step, the droplets of the inkjet ink are ejected from the inkjet head and landed on the recording medium at a position corresponding to an image to be formed.

The ejection method from the inkjet head may be either an on-demand method or a continuous method. The inkjet head in the on-demand method may be any one of electro-mechanical conversion types such as a single cavity type, a double cavity type, a bender type, a piston type, a share mode type, and a shared wall type; and electro-thermal conversion types such as thermal inkjet type and bubble jet type ("bubble jet" is a registered trademark of Canon Inc.).

Ejection stability can be improved by ejecting the droplets of the inkjet ink from the inkjet head in a heated state. The temperature of ink at the time of ejecting is preferably 35° C. to 100° C., and more preferably 35° C. to 80° C. in order to further improve ejection stability. In particular, it is preferable that ejecting is performed at an ink temperature such that the viscosity of ink is 7 mPa·s to 15 mPa·s, and preferably 8 mPa·s to 13 mPa·s.

In order to increase the ejecting properties of ink from an ejection recording head, the inkjet ink is configured such that the temperature of the ink when filled in the ejection recording head is set to (gelation temperature+10)° C. to (gelation temperature+30)° C. When the temperature of ink in the ejection recording head is lower than (gelation temperature+10)° C., the ink is gelled in the ejection recording head or on the surface of the nozzle, the ejectability of the ink easily deteriorates. Meanwhile, when the temperature of ink in the ejection recording head is higher than (gelation temperature+30)° C., the ink becomes too hot, the ink components may deteriorate.

The method of heating the ink to a predetermined temperature is not particularly limited. For example, at least one of an ink supply system such as an ink tank constituting a head carriage, a supply pipe and a front chamber ink tank just before the head, a pipe with a filter, a piezo head and the like can be heated to a predetermined temperature by a panel heater, a ribbon heater, and warm water.

The amount of droplets of ink when ejected is preferably 2 pL to 20 pL in terms of recording speed and image quality.

2-2. Second Process

In the second process, the inkjet ink landed in the first process is irradiated with active rays to form an image by curing these inks. Preferably, the active rays are applied for 0.001 to 1.0 seconds after landing of the ink, and more preferably the active rays are applied for 0.001 to 0.5 seconds in order to form a high-definition image.

The active ray to be applied to the ink can be selected from, for example, electron beam, ultraviolet ray, α ray, γ ray, and X ray. Among these, ultraviolet ray is preferably applied. The ultraviolet ray can be applied by, for example, a 395 nm water cooled LED, manufactured by Phoseon Technology Corporation. It is possible to suppress the occurrence of poor curing of the ink due to ink melting caused by the radiation heat of a light source by using an LED as the light source.

The LED light source is provided such that the peak illuminance of ultraviolet ray having a wavelength of 370 nm to 410 nm on the surface of an image is 0.5 W/cm$^2$ to 10 W/cm$^2$, and more preferably is provided such that the peak illuminance is 1 W/cm$^2$ to 5 W/cm$^2$. From the viewpoint of suppressing the irradiation of the ink with radiation heat, it is preferable that the amount of light applied on the image is less than 1000 mJ/cm$^2$.

Further, when the oxygen concentration around the ink is lowered at the time of applying light, it is also possible to sufficiently cure the ink having a smaller amount of the radical polymerization initiator. Therefore, it is possible to suppress the degradation of image quality due to bleed-out of residues of the radical polymerization initiator. As means for lowering the oxygen concentration, there can be exemplified gas substitution with nitrogen gas or the like. From the above viewpoint, the oxygen concentration around the ink when applying light is preferably 0.1 vol % to 10.0 vol %, more preferably 0.5 vol % to 8.0 vol %, and further more preferably 0.5 vol % to 6.0 vol %. It is possible to sufficiently cure the ink even with a smaller amount of light by lowering the oxygen concentration around the ink.

The process of applying active rays is divided into two steps. That is, active rays may be applied for 0.001 to 2.0 seconds by the above-described method after landing the ink to temporarily cure the ink, and then the active rays may be further applied to the ink after completing all the printing to finally cure the ink. When dividing the process of applying active rays into two steps, the shrinkage of a recording material, occurring at the time of curing the ink, is difficult to occur.

In the image forming method of the present invention, when the total ink film thickness after irradiating the ink landed on the recording medium with active rays to cure the ink is set to 2 µm to 20 µm, it is possible to more effectively prevent the occurrence of curling and wrinkling of the recording medium and the change in texture of the recording medium. Here, the "total ink film thickness" means a total value of film thicknesses of ink applied or printed on the recording medium or an average value of the film thicknesses measured at a plurality of spots at which a large amount of ink is landed.

2-3. Recording Medium

The recording medium used in the image forming method of the present invention may be a recording medium on which an image is formed with the ink set. Examples of the recording medium can include non-absorbent recording media (plastic substrate) made of plastics such as polyester, polyvinyl chloride, polyethylene, polyurethane, polypropylene, acrylic resin, polycarbonate, polystyrene, an acrylonitrile-butadiene-styrene copolymer, polyethylene terephthalate, and polybutadiene terephthalate; non-absorbent inorganic recording media such as metals and glass; and absorbent papers (for example, printing coated paper and printing coated paper B).

EXAMPLES

Hereinafter, the present invention will be described in more detail with reference to Examples. The scope of the present invention is not to be construed as being limited by these examples.

1. Preparation of Ink

Ink was prepared using the following components.

[Radical Polymerizable Compound]

SR 344: polyethylene glycol (400) diacrylate (SR344, manufactured by Sartomer Corporation)

SR 454: 3-EO modified trimethylolpropane triacrylate (SR 454, manufactured by Sartomer Corporation)

HDDA: 1,6-hexanediol diacrylate

APG-100: dipropylene glycol diacrylate (APG-100, manufactured by Shin-Nakamura Chemical Co., Ltd.)

A-DCP: tricyclodecanedimethanol diacrylate (A-DCP, manufactured by Shin-Nakamura Chemical Co., Ltd.)

SR339: 2-phenoxyethyl acrylate (SR339, manufactured by Sartomer Corporation)

[Aldehyde Producing Initiator]

Irg 819: bis(2,4,6-trimethylbenzoyl)-phenylphosphine oxide (IRGACURE 819, manufactured by BASF Corporation)

TPO: 2,4,6-trimethylbenzoyl-diphenyl-phosphine oxide (IRGACURE TPO, manufactured by BASF Corporation)

Irg 907: 2-methyl-1-(4-methylthiophenyl)-2-morpholino-propane-1-one (IRGACURE 907, manufactured by BASF Corporation)

[Other Radical Polymerization Initiator]

Irg OXE 01: 1.2-octanedione, 1-[4-(phenylthio)-2-(O-benzoyloxime)] (IRGACURE OXE 01, manufactured by BASF Corporation)

[Odor Material Scavenger]

Amine-based scavenger-1: bis(4-aminocyclohexyl) methane (molecular weight: 210) Amine-based scavenger-2: di-n-hexylamine (molecular weight: 185) Amine-based scavenger-3: 2-aminobenzamide (molecular weight: 136) OH-based scavenger-1: 2,2,4-trimethyl-1,3-pentanediol (molecular weight: 146)

OH-based scavenger-2: propyl gallate (molecular weight: 202)

OH-based scavenger-3: hesperidin (molecular weight: 611)

[Compound Containing Amine Group or Hydroxyl Group Other Than Odor Material Scavenger]

CN 371: CN371 (amine-modified oligomer used in the examples of JP 2015-533876 A) manufactured by Sartomer Corporation EDB: ethyl 4-(dimethylamino) benzoate (compound having a tertiary amine group in the molecule, molecular weight: 193)

Isosorbide: isosorbide (a compound having a hydroxyl group where α-position carbon is secondary carbon, molecular weight: 146)

[Polymerization Inhibitor]

UV-10: IRGASTAB UV10 manufactured by BASF Corporation ("IRGASTAB" is a registered trademark of this company)

[Gelling Agent]

T1: distearyl ketone (KAOWAX T1, manufactured by Kao Corporation)

SS: stearyl stearate (EXCEPARL SS, manufactured by Kao Corporation)

BA: behenic acid (LUNAK BA, manufactured by Kao Corporation) ("LUNAK" is a registered trademark of this company)

KP: palmitic acid amide (DIAMID KP, manufactured by Nippon Kasei Chemical Co., Ltd.) ("DIAMID" is a registered trademark of this company)

B 100: pentacosylic acid monoglyceride (POEM B100, manufactured by Riken Vitamin Co., Ltd.)

Lauryl alcohol

Example 1

1-1. Preparation of Pigment Dispersion

Three kinds of compounds shown below were put into a stainless steel beaker. This resultant was heated and stirred for 1 hour while heating on a 65° C. hot plate to dissolve a dispersant.

Dispersant: BYK JET-9151 manufactured by BYK Japan K.K. ("BYK" is a registered trademark of the company), 8 parts by mass Radical polymerizable compound: APG-100, 72 parts by mass Polymerization inhibitor: UV 10, 0.1 parts by mass After the obtained solution was cooled to room temperature, 20 parts by mass of the following pigment was added thereto, and this resultant was put into a glass bottle together with 200 g of zirconia beads having a diameter of 0.5 mm and the glass bottle was sealed. This resultant was dispersed for 5 hours in a paint shaker, and then the zirconia beads were removed, so as to obtain a pigment dispersion K.

Pigment: PBk 7 (MA-7, manufactured by Mitsubishi Chemical Corporation), 20 parts by mass Pigment dispersion C was obtained in the same manner as in the preparation of the pigment dispersion K, except that PB 15:4 (FASTOGEN Blue 5485, manufactured by DIC Corporation) was used as the pigment.

1-2. Preparation of Ink

Each component was added to any one of the pigment dispersions such that component ratios would be those shown in Tables 1 to 4, and stirred at 80° C., so as to obtain an ink solution. The ink solution was filtered through a 3 μm membrane filter manufactured by ADVANTEC to obtain inks 1 to 31.

TABLE 1

Ink Nos. 1 to 10

| | | Ink No. | | | | | | | | | |
|---|---|---|---|---|---|---|---|---|---|---|---|
| | | 1 | 2 | 3 | 4 | 5 | 6 | 7 | 8 | 9 | 10 |
| Radical polymerizable compound | SR344 | 20.0 | 20.0 | 20.0 | 20.0 | 20.0 | 20.0 | 20.0 | 20.0 | 20.0 | 20.0 |
| | SR454 | 28.9 | 28.9 | 32.9 | 32.9 | 32.9 | 32.9 | 32.9 | 32.9 | 32.9 | 32.9 |
| | HDDA | 15.0 | 15.0 | 15.0 | 20.0 | 20.0 | 20.0 | 20.0 | 20.0 | 20.0 | 20.0 |
| | APG100 | 5.0 | 5.0 | 5.0 | 5.0 | 5.0 | 5.0 | 5.0 | 5.0 | 5.0 | 5.0 |
| | A-DCP | 10.0 | 10.0 | 10.0 | 10.0 | 10.0 | 10.0 | 10.0 | 10.0 | 10.0 | 10.0 |
| | SR339 | 9.0 | 9.0 | 5.0 | | | | | | | |
| Aldehyde producing initiator | Irg819 | 5.0 | | 5.0 | 5.0 | 5.0 | 5.0 | 5.0 | 5.0 | 5.0 | |
| | TPO | | 5.0 | | | | | | | | |
| | Irg907 | | | | | | | | | | 5.0 |
| Odor material scavenger | Amine-based scavenger-1 | 2.0 | 2.0 | 2.0 | 2.0 | | | | | | |
| | Amine-based scavenger-2 | | | | | | | 2.0 | | | |
| | Amine-based scavenger-3 | | | | | | | | 2.0 | | |
| | OH-based scavenger-1 | | | | | | | | | 2.0 | |
| | OH-based scavenger-2 | | | | | | | | | 2.0 | 2.0 |
| | OH-based scavenger-3 | | | | | | 2.0 | | | | |
| Dispersant | K | | | | | | | | | | |
| | C | 5.0 | 5.0 | 5.0 | 5.0 | 5.0 | 5.0 | 5.0 | 5.0 | 5.0 | 5.0 |
| Polymerization inhibitor | UV-10 | 0.1 | 0.1 | 0.1 | 0.1 | 0.1 | 0.1 | 0.1 | 0.1 | 0.1 | 0.1 |

TABLE 2

Ink Nos. 11 to 19

| | | Ink No. | | | | | | | | |
|---|---|---|---|---|---|---|---|---|---|---|
| | | 11 | 12 | 13 | 14 | 15 | 16 | 17 | 18 | 19 |
| Radical polymerizable compound | SR344 | 20.0 | 20.0 | 20.0 | 20.0 | 20.0 | 20.0 | 20.0 | 20.0 | 20.0 |
| | SR454 | 34.9 | 35.9 | 36.4 | 36.8 | 32.9 | 32.9 | 32.9 | 32.9 | 32.9 |
| | HDDA | 20.0 | 20.0 | 20.0 | 20.0 | 20.0 | 20.0 | 20.0 | 20.0 | 20.0 |
| | APG100 | 5.0 | 5.0 | 5.0 | 5.0 | 5.0 | 5.0 | 5.0 | 5.0 | 5.0 |
| | A-DCP | 10.0 | 10.0 | 10.0 | 10.0 | 10.0 | 10.0 | 10.0 | 10.0 | 10.0 |
| | SR339 | | | | | | | | | |
| Aldehyde producing initiator | Irg819 | 3.0 | 3.0 | 3.0 | 3.0 | 5.0 | 5.0 | 5.0 | 5.0 | 5.0 |
| | TPO | | | | | | | | | |
| | Irg907 | | | | | | | | | |
| Odor material scavenger | Amine-based scavenger-1 | | | | | 2.0 | | | | |
| | Amine-based scavenger-2 | | | | | | | 2.0 | | |

TABLE 2-continued

Ink Nos. 11 to 19

| | | 11 | 12 | 13 | 14 | 15 | 16 | 17 | 18 | 19 |
|---|---|---|---|---|---|---|---|---|---|---|
| | Amine-based scavenger-3 | 2.0 | 1.0 | 0.5 | 0.1 | | | 2.0 | | |
| | OH-based scavenger-1 | | | | | | | | 2.0 | |
| | OH-based scavenger-2 | | | | | | | | | 2.0 |
| | OH-based scavenger-3 | | | | | | | | | |
| Dispersant | K | | | | | 5.0 | 5.0 | 5.0 | 5.0 | 5.0 |
| | C | 5.0 | 5.0 | 5.0 | 5.0 | | | | | |
| Polymerization inhibitor | UV-10 | 0.1 | 0.1 | 0.1 | 0.1 | 0.1 | 0.1 | 0.1 | 0.1 | 0.1 |

TABLE 3

Ink Nos. 20 to 23

| | Ink No. | 20 | 21 | 22 | 23 |
|---|---|---|---|---|---|
| Radical polymerizable compound | SR344 | 20.0 | 20.0 | 20.0 | 20.0 |
| | SR454 | 34.9 | 35.9 | 36.4 | 36.8 |
| | HDDA | 20.0 | 20.0 | 20.0 | 20.0 |
| | APG100 | 5.0 | 5.0 | 5.0 | 5.0 |
| | A-DCP | 10.0 | 10.0 | 10.0 | 10.0 |
| | SR339 | | | | |
| Aldehyde producing initiator | Irg819 | 3.0 | 3.0 | 3.0 | 3.0 |
| | TPO | | | | |
| | Irg907 | | | | |
| Odor material scavenger | Amine-based scavenger-1 | | | | |
| | Amine-based scavenger-2 | | | | |
| | Amine-based scavenger-3 | 2.0 | 1.0 | 0.5 | 0.1 |
| | OH-based scavenger-1 | | | | |
| | OH-based scavenger-2 | | | | |
| | OH-based scavenger-3 | | | | |
| Dispersant | K | 5.0 | 5.0 | 5.0 | 5.0 |
| | C | | | | |
| Polymerization inhibitor | UV-10 | 0.1 | 0.1 | 0.1 | 0.1 |

TABLE 4

Ink Nos. 24 to 31

| | | 24 | 25 | 26 | 27 | 28 | 29 | 30 | 31 |
|---|---|---|---|---|---|---|---|---|---|
| Radical polymerizable compound | SR344 | 20.0 | 20.0 | 20.0 | 20.0 | 20.0 | 20.0 | 20.0 | 20.0 |
| | SR454 | 15.9 | 32.9 | 36.9 | 27.9 | 32.9 | 32.9 | 32.9 | 32.4 |
| | HDDA | 15.0 | 20.0 | 20.0 | 20.0 | 20.0 | 20.0 | 20.0 | 20.0 |
| | APG100 | 5.0 | 5.0 | 5.0 | 5.0 | 5.0 | 5.0 | 5.0 | 5.0 |
| | A-DCP | 10.0 | 10.0 | 10.0 | 10.0 | 10.0 | 10.0 | 10.0 | 10.0 |
| | SR339 | 22.0 | | | | | | | |
| Aldehyde producing initiator | Irg819 | 5.0 | | 5.0 | 5.0 | 5.0 | 5.0 | 5.0 | 3.0 |
| Other radical polymerization initiator | Irg0XE01 | | 5.0 | | | | | | |
| Odor material scavenger | Amine-based scavenger-1 | 2.0 | | | | | | | |
| | Amine-based scavenger-2 | | | | | | | | |
| | Amine-based scavenger-3 | | | 2.0 | 2.0 | 2.0 | | | 4.5 |
| Compounds other than odor material scavenger | CN371 | | | | | 2.0 | | | |
| | EDB | | | | | | 2.0 | | |
| | Isosorbide | | | | | | | 2.0 | |
| Dispersant | K | | | | 10.0 | 5.0 | 5.0 | 5.0 | 5.0 |
| | C | 5.0 | 5.0 | 1.0 | | | | | |
| Polymerization inhibitor | UV-10 | 0.1 | 0.1 | 0.1 | 0.1. | 0.1 | 0.1 | 0.1 | 0.1 |

2. Evaluation

2-1. Absorbance

Various adjusted inks were diluted with a radical polymerizable compound contained in each sample to a concentration such that the maximum absorbance was in the range of 0.5 to 1.0, the absorbance of the diluted solution was measured with a spectrophotometer (UV-VIS SPECTROPHOTOMETER V-550, manufactured by JASCO Corporation), and the absorbance of the ink was obtained by multiplying the measured value by a dilution magnification. In addition, the absorbance was determined to be ○ when the absorbance to light having a wavelength of at least part of 365 nm to 395 nm is within 400 to 1000 while the absorbance was determined to be x when the absorbance to light having the wavelength of even part of 365 nm to 395 nm is not within 400 to 1000.

2-2. Migration

Each of the inks was charged in an ink jet recording apparatus having an ink jet recording head provided with a piezo type ink jet nozzle. Image recording was continuously performed using this recording apparatus while conveying a recording medium (HA 512, manufactured by Konica Minolta, Inc.). The conveying speed of the recording medium was set to 800 mm/sec.

The ink supply system of the ink jet recording apparatus was provided with an ink tank, an ink flow path, a sub ink tank immediately before the ink jet recording head, a pipe equipped with a metal filter, and a piezo head equipped with a built-in heater in the direction of ink flow. In the piezo head, heads having a nozzle diameter of 22 μm and a nozzle resolution of 600 dpi were arranged in staggered fashion to form a nozzle row of 1200 dpi. Using this ink jet apparatus, a voltage was applied such that the droplet amount became 9.0 pl, and a solid image was printed on the recording medium at 1200×1200 dpi. The temperature of a drum was controlled such that the surface temperature of a substrate before the head was 46° C. The "dpi" represents the number of dots per 2.54 cm.

After printing, an ink layer was cured by emitting active rays from an LED lamp (manufactured by Kyocera Corporation) within 1 second. The distance from the LED lamp to the recording medium was set to 50 mm.

100 ml of a mixed solution at a ratio of water:ethanol=5:95 was brought into contact with the back surface (film surface) of a circular solid printed matter having a diameter of 10 cm, and was left at 60° C. for 10 days in a state in which the mixed solution was charged in an airtight metal container in order to prevent the volatilization of the mixed solution. Then, each amount of a radical polymerizable compound, a radical polymerization initiator (aldehyde producing initiator), a decomposition product (aldehyde) of a radical polymerization initiator, or an odor material scavenger (the above-mentioned "compound other than the odor material scavenger" in ink Nos. 28 and 29), contained in the above mixed solution, was examined by high performance liquid chromatography (HPLC), and the result was taken as the migration amount of each material. In HPLC, the ratio of the total peak area detected by a differential refractive index (RI) to the peak area of paraoxybenzoic acid ester having an internal standard of 10 ppm was calculated under the conditions of a column of Inertsil ODS-SP (manufactured by GL Sciences Inc.), a column temperature of 40° C., a mobile phase composition of water/methanol=1/1, and a flow rate of 1 mL/min. Based on the migration amount obtained in this way, the migration of each material was evaluated in the following four steps.

⊚: Level at which no problem occurs because the ratio of the detected peak area to the peak area of an internal standard is 5% or less ○: Level at which no problem occurs because the ratio of the detected peak area to the peak area of an internal standard is 10% or less Δ: Level at which a slight problem occurs because the ratio of the detected peak area to the peak area of an internal standard is 20% or less x: Level at which a problem practically occurs because the ratio of the detected peak area to the peak area of an internal standard is more than 20%

2-3. Odor

A solid image of 7 cm×20 cm was formed on a PP film with the addition amount of 9 g/m² under the above conditions. The image immediately after formation was stored in a glass bottle with a lid, and, after 12 hours, the odor was evaluated by 10 evaluators under the following criteria.

⊚: Almost odorless

○: A slight odor is felt, but it is not worrisome

Δ: An odor is felt, but it is within an acceptable range x: Strong odor

2-4. Storage Stability

The average particle diameter of pigment particles in each ink diluted with polyethylene glycol diacrylate (PEGDA) 200 times was measured by a dynamic light scattering method using Data Sizer Nano ZSP manufactured by Malvern Corporation. Each active ray curable ink was collected in a heat-resistant tube and stored in a high-temperature tank at 100° C. for 2 weeks, and then the average particle diameter of the pigment particles was similarly measured. The difference ($P_A - P_B$) between average particle diameter ($P_A$) before storage and average particle diameter ($P_B$) after storage was calculated.

⊚: $P_A - P_B$ is less than 7 nm

○: $P_A - P_B$ is 7 nm or more and less than 15 nm

Δ: $P_A - P_B$ is 15 nm or more

2-5. Evaluation Results

The absorbance measured from ink 1 to ink 31 and the evaluation results of migration, odor and storage stability of each of the above materials are shown in Tables 5 and 6.

TABLE 5

| | | Evaluation of ink Nos. 1 to 16 | | | | | |
|---|---|---|---|---|---|---|---|
| | | | Migration | | | | |
| Ink No. | Absorbance | Radical polymerizable compound | Radical polymerization initiator | Aldehyde | Odor material scavenger | Odor | Storage stability |
| 1 | ○ | Δ | Δ | Δ | Δ | Δ | Δ |
| 2 | ○ | Δ | Δ | Δ | Δ | Δ | Δ |
| 3 | ○ | ○ | Δ | Δ | ○ | Δ | Δ |
| 4 | ○ | ○ | ○ | ○ | ○ | ○ | Δ |

TABLE 5-continued

Evaluation of ink Nos. 1 to 16

| Ink No. | Absorbance | Migration Radical polymerizable compound | Migration Radical polymerization initiator | Migration Aldehyde | Migration Odor material scavenger | Odor | Storage stability |
|---|---|---|---|---|---|---|---|
| 5 | ○ | ○ | ○ | Δ | ○ | Δ | ○ |
| 6 | ○ | ○ | ○ | ○ | ○ | ⊙ | ○ |
| 7 | ○ | ○ | ○ | ⊙ | ⊙ | ⊙ | ⊙ |
| 8 | ○ | ○ | ○ | ○ | ○ | ⊙ | ○ |
| 9 | ○ | ○ | ○ | ○ | ○ | ⊙ | ○ |
| 10 | ○ | ○ | ○ | Δ | ○ | ○ | ○ |
| 11 | ○ | ○ | ⊙ | ⊙ | ⊙ | ⊙ | ⊙ |
| 12 | ○ | ○ | ⊙ | ⊙ | ⊙ | ⊙ | ⊙ |
| 13 | ○ | ○ | ⊙ | ○ | ⊙ | ○ | ⊙ |
| 14 | ○ | ○ | ⊙ | Δ | ⊙ | ○ | ⊙ |
| 15 | ○ | ○ | ⊙ | Δ | ○ | Δ | Δ |
| 16 | ○ | ○ | ⊙ | Δ | ○ | ○ | ○ |

TABLE 6

Evaluation of ink Nos. 17 to 31

| Ink No. | Absorbance | Migration Radical polymerizable compound | Migration Radical polymerization initiator | Migration Aldehyde | Migration Odor material scavenger | Odor | Storage stability |
|---|---|---|---|---|---|---|---|
| 17 | ○ | ○ | ⊙ | ○ | ⊙ | ○ | ⊙ |
| 18 | ○ | ○ | ⊙ | Δ | ○ | ○ | ○ |
| 19 | ○ | ○ | ⊙ | Δ | ○ | ○ | ○ |
| 20 | ○ | ○ | ⊙ | ⊙ | ⊙ | ○ | ⊙ |
| 21 | ○ | ○ | ⊙ | ○ | ⊙ | ⊙ | ⊙ |
| 22 | ○ | ○ | ⊙ | ○ | ⊙ | Δ | ⊙ |
| 23 | ○ | ○ | ⊙ | Δ | ⊙ | Δ | ⊙ |
| 24 | ○ | X | Δ | X | X | Δ | Δ |
| 25 | ○ | Δ | Δ | X | X | X | ⊙ |
| 26 | X | ○ | ○ | X | ⊙ | X | ⊙ |
| 27 | X | X | X | ○ | X | Δ | ⊙ |
| 28 | ○ | ○ | ○ | X | Δ | X | ⊙ |
| 29 | ○ | ○ | ○ | X | Δ | X | ⊙ |
| 30 | ○ | ○ | ○ | X | Δ | X | ⊙ |
| 31 | ○ | ○ | ⊙ | ○ | X | ○ | ○ |

In ink Nos. 1 to 23 containing a radical polymerizable compound, an aldehyde producing initiator and an odor material scavenger and having a monofunctional radical polymerization initiator content of 0 mass % to 10 mass %, the migration amount of each material was small, and an odor was also low.

Particularly, in ink Nos. 1 to 9 and 11 to 23 having a keto group as a cutting site and containing an aldehyde producing initiator in which carbon atoms constituting the keto group are directly bonded to a mesityl group, the migration amount of aldehyde was small, and an odor was also low (particularly, in comparison with ink 9 and ink 10).

In ink Nos. 7, 11 to 14, 17 and 20 to 23 containing an amine-based scavenger as an aromatic substituted amine, storage stability was higher.

In ink Nos. 11 to 14 and 20 to 23 in which the content of an aldehyde producing initiator is 0.1 mass % to 4.0 mass %, the migration amounts of the aldehyde producing initiator and the odor material scavenger tended to decrease. This is considered to be due to the fact that the aldehyde producing initiator was sufficiently decomposed, and the produced aldehyde could sufficiently react with the odor material scavenger, and thus the amount of unreacted components was small.

In ink Nos. 15 to 23 in which the absorbance to light having a wavelength of 365 nm to 395 nm is higher, the migration amount of the aldehyde producing initiator was smaller (particularly, in comparison with ink Nos. 4 to 14). This is considered because the light absorbed by the ink is low, it is difficult for the applied light to be blocked by a color material, and a larger amount of an aldehyde producing initiator is decomposed.

Meanwhile, in ink No. 24 in which the content of a monofunctional radical polymerization initiator is more than 10 mass %, the migration amount of each material was large, and the odor was also high. This is considered because the reticular hydrocarbon chain due to the crosslinking of the radical polymerization initiator was not sufficiently formed, and each of the above materials was apt to pass through a hydrocarbon chain.

Further, even in ink No. 25 in which a radical polymerization initiator other than the aldehyde producing initiator was used, the migration amount of each material was large, and the odor was also high. This is considered because the migration could not be suppressed even by the odor material scavenger because no aldehyde was produced.

Further, in ink No. 26 in which the absorbance to light having a wavelength of 365 nm to 395 nm is less than 400, the migration amount of the aldehyde was large, and the odor was also high. This is considered because the blocking of light by the color material decreased, so that a large amount of the aldehyde producing initiator was decomposed, and an excessive amount of aldehyde was produced compared with the amount of the odor material scavenger.

Further, in ink No. 27 in which the absorbance to light having a wavelength of 365 nm to 395 nm is more than 1000, the migration amounts of a radical polymerizable compound, an aldehyde producing initiator and an odor material scavenger are large, and the odor was also high. This is considered because the amount of the unreacted radical polymerizable compound increased, the amount of the aldehyde producing initiator remaining without being decomposed also increased, and the amount of the odor material scavenger remaining without reacting with aldehyde also increased.

Further, in ink Nos. 28 to 30 to which a compound having an amine group but having a molecular weight of more than 1000, a compound having a tertiary amine group in the molecule, or a compound having a hydroxyl group where α-position carbon is secondary carbon was added, the migration amounts of aldehyde and the above compounds were high, and the odor was also high. This is considered because the above compound hardly reacts with aldehyde due to steric hindrance, and it was difficult to produce hemiaminal or hemiacetal.

Further, in ink No. 31 in which the content of an odor material scavenger is larger than the content of a radical polymerization initiator, the migration amount of the odor material scavenger was large. This is considered because a large amount of the odor material scavenger that cannot react with aldehyde existed.

Example 2

2-1. Preparation of Ink

Each component was added to any one of the pigment dispersions prepared in Example 1 such that component ratios would be those shown in Table 7, and stirred at 80° C., so as to obtain an ink solution. The ink solution was filtered through a 3 μm membrane filter manufactured by ADVANTEC to obtain inks 32 to 38.

TABLE 7

Ink Nos. 32 to 38

| | | Ink No. | | | | | | |
|---|---|---|---|---|---|---|---|---|
| | | 32 | 33 | 34 | 35 | 36 | 37 | 38 |
| Radical polymerizable compound | SR344 | 20.0 | 20.0 | 20.0 | 20.0 | 20.0 | 20.0 | 20.0 |
| | SR454 | 30.9 | 30.9 | 29.9 | 29.9 | 30.9 | 28.9 | 29.9 |
| | HDDA | 20.0 | 20.0 | 20.0 | 20.0 | 20.0 | 20.0 | 20.0 |
| | APG100 | 5.0 | 5.0 | 5.0 | 5.0 | 5.0 | 5.0 | 5.0 |
| | A-DCP | 10.0 | 10.0 | 10.0 | 10.0 | 10.0 | 10.0 | 10.0 |
| | SR339 | 0.0 | 0.0 | 0.0 | 0.0 | 0.0 | 0.0 | 0.0 |
| Aldehyde producing initiator | Irg819 | 5.0 | 5.0 | 5.0 | 5.0 | 5.0 | 5.0 | 5.0 |
| | TPO | | | | | | | |
| Other radical polymerization initiator | IrgOXE01 | | | | | | | |
| Dispersant | K | | | | | | | |
| | C | 5.0 | 5.0 | 5.0 | 5.0 | 5.0 | 5.0 | 5.0 |
| Odor material scavenger | Amine-based scavenger-1 | 2.0 | 2.0 | 2.0 | 2.0 | 2.0 | 2.0 | 2.0 |
| Gelling agent | T1 | 2.0 | | | | | 2.0 | |
| | SS | | 2.0 | | | | 2.0 | |
| | BA | | | 3.0 | | | | |
| | KP | | | | 3.0 | | | |
| | B100 | | | | | 2.0 | | |
| | Lauryl alcohol | | | | | | | 3.0 |
| Polymerization inhibitor | UV-10 | 0.1 | 0.1 | 0.1 | 0.1 | 0.1 | 0.1 | 0.1 |

The obtained ink 32 to ink 38 were evaluated in the same criteria as in Example 1. However, each of the inks was heated to 90° C. from the ink tank to the head portion to circulate the ink. Even in the piezo head, the ink was heated by a heater, and the ink in the recording head was reheated to 90° C.

The absorbance, migration, odor and storage stability of each of the inks were evaluated in the same manner as in Example 1.

The absorbance measured from the ink 32 to the ink 38 and the evaluation results of migration, odor and storage stability of each of the materials are shown in Table 8.

TABLE 8

Evaluation of ink Nos. 32 to 38

| Ink No. | Absorbance | Migration Radical polymerizable compound | Migration Radical polymerization initiator | Migration Aldehyde | Migration Odor material scavenger | Odor | Storage stability |
|---|---|---|---|---|---|---|---|
| 32 | ○ | ⊙ | ○ | ○ | ⊙ | ○ | △ |
| 33 | ○ | ⊙ | ○ | ○ | ⊙ | ○ | △ |
| 34 | ○ | ⊙ | ○ | ○ | ○ | ○ | △ |
| 35 | ○ | ⊙ | ○ | ○ | ○ | ○ | △ |
| 36 | ○ | ⊙ | ○ | ○ | ⊙ | ○ | △ |
| 37 | ○ | ⊙ | ⊙ | ⊙ | ⊙ | ⊙ | △ |
| 38 | ○ | ⊙ | ○ | ○ | ○ | ○ | △ |

The migration amount of a radical polymerizable compound in each of the inks Nos. 32 to 38 having a gelling agent was smaller than the migration amount of a radical polymerizable compound in the ink No. 4 not containing a gelling agent. In the ink Nos. 32, 33, 36, and 37 containing a ketone wax represented by Formula (G1) or an ester wax represented by Formula (G2), the migration amount of the odor material scavenger is also smaller. In the ink No. 37 containing a ketone wax represented by Formula (G1) or an ester wax represented by Formula (G2), the migration amounts of other components are also smaller.

The inkjet ink according to the present invention can reduce an aldehyde-derived odor from a formed image, and can also reduce a migration amount. Therefore, this inkjet ink can be preferably used for forming an image on food packaging or the like which is required to reduce an odor and to suppress the adhesion of a migrated material to foods, and can contribute to the spread of an inkjet image forming method.

Although embodiments of the present invention have been described and illustrated in detail, it is clearly understood that the same is by way of illustration and example only and not limitation, the scope of the present invention should be interpreted by terms of the appended claims.

What is claimed is:

1. An active ray curable inkjet ink comprising:
   a radical polymerizable compound;
   a radical polymerization initiator;
   a color material; and
   an odor material scavenger,
   wherein the radical polymerization initiator is a compound producing aldehyde by irradiation with active rays, and the radical polymerization initiator has a mesityl group or a phenyl group,
   the radical polymerizable compound does not substantially contain a monofunctional radical polymerizable compound,
   the radical polymerizable compound comprises an ethylene oxide-modified radical polymerizable compound and a propylene oxide-modified radical polymerizable compound, and the ethylene oxide-modified radical polymerizable compound has 2 to 14 ethylene oxide groups and the propylene oxide-modified radical polymerizable compound has 2 to 12 propylene oxide groups,
   a total amount of the ethylene oxide-modified radical polymerizable compound and the propylene oxide-modified radical polymerizable compound is 39.9 to 89.9 mass % with respect to the total mass of the ink,
   the odor material scavenger is an aromatic compound having a primary amine group in a molecule and having a molecular weight of 1000 or less,
   the content of the odor material scavenger is lower than the content of the radical polymerization initiator,
   the content of the radical polymerization initiator is 2 to 5 mass % with respect to the total mass of the ink,
   the content of the odor material scavenger is 0.1 to 2.0 mass % with respect to the total mass of the ink, and
   the absorbance of the inkjet ink to light having a wavelength of 365 nm to 395 nm is 400 to 1000.

2. The inkjet ink according to claim 1, wherein the radical polymerization initiator contains a compound which has a keto group as a cutting site and in which a carbon atom constituting the keto group is directly bonded to the mesityl group.

3. The inkjet ink according to claim 1, wherein the molecular weight of the odor material scavenger is 500 or less.

4. The inkjet ink according to claim 1, further comprising a gelling agent.

5. The inkjet ink according to claim 1, wherein the radical polymerization initiator has the mesityl group.

6. An active ray curable inkjet ink comprising:
   a radical polymerizable compound;
   a radical polymerization initiator;
   a color material; and
   an odor material scavenger,
   wherein the radical polymerization initiator is a compound producing aldehyde by irradiation with active rays, and the radical polymerization initiator has a mesityl group or a phenyl group,
   the radical polymerizable compound does not substantially contain a monofunctional radical polymerizable compound,
   the radical polymerizable compound comprises an ethylene oxide-modified radical polymerizable compound or a propylene oxide-modified radical polymerizable compound, and the ethylene oxide-modified radical polymerizable compound has 2 to 14 ethylene oxide groups and the propylene oxide-modified radical polymerizable compound has 2 to 12 propylene oxide groups,
   a total amount of the ethylene oxide-modified radical polymerizable compound and the propylene oxide-modified radical polymerizable compound is 44.9 to 89.9 mass % with respect to the total mass of the ink,
   the odor material scavenger is an aromatic compound having a primary amine group in a molecule and having a molecular weight of 1000 or less, the content of the odor material scavenger is lower than the content of the radical polymerization initiator, the content of the radical polymerization initiator is 2 to 5 mass % with respect to the total mass of the ink, the content of the odor material scavenger is 0.1 to 2.0 mass % with respect to the total mass of the ink, and the absorbance of the inkjet ink to light having a wavelength of 365 nm to 395 nm is 400 to 1000.

7. An image forming method comprising:

ejecting droplets of the inkjet ink of claim 1 from a nozzle of an inkjet head and landing the droplets on a recording medium; and irradiating the droplets landed on the recording medium with active rays.

* * * * *